Nov. 19, 1929.  B. CASTIGLIA  1,736,577
HEADLIGHT CONTROLLING DEVICE
Filed Nov. 4, 1927   2 Sheets-Sheet 1
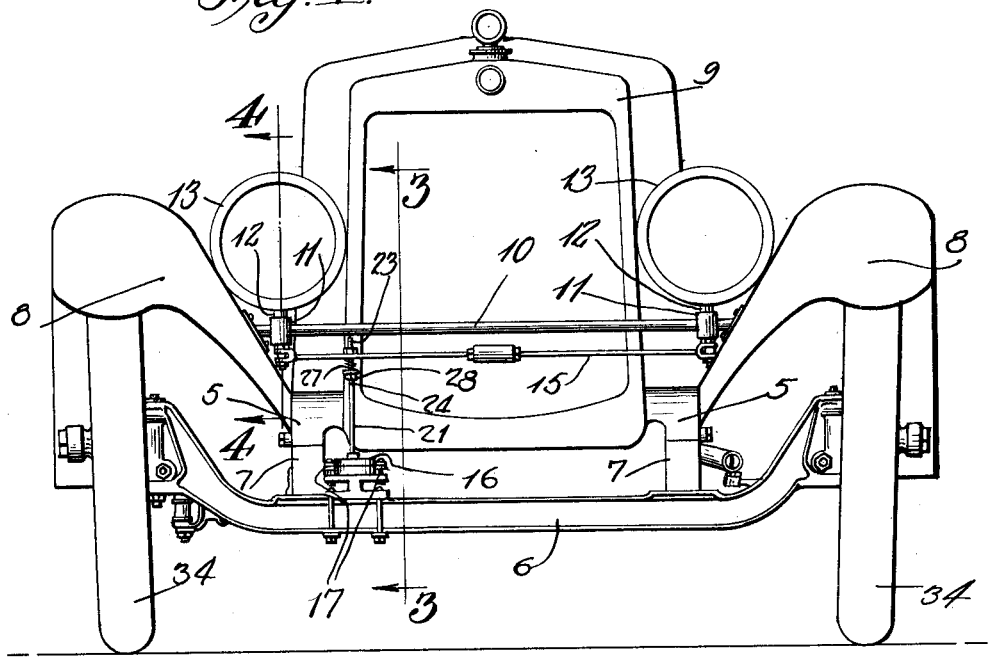
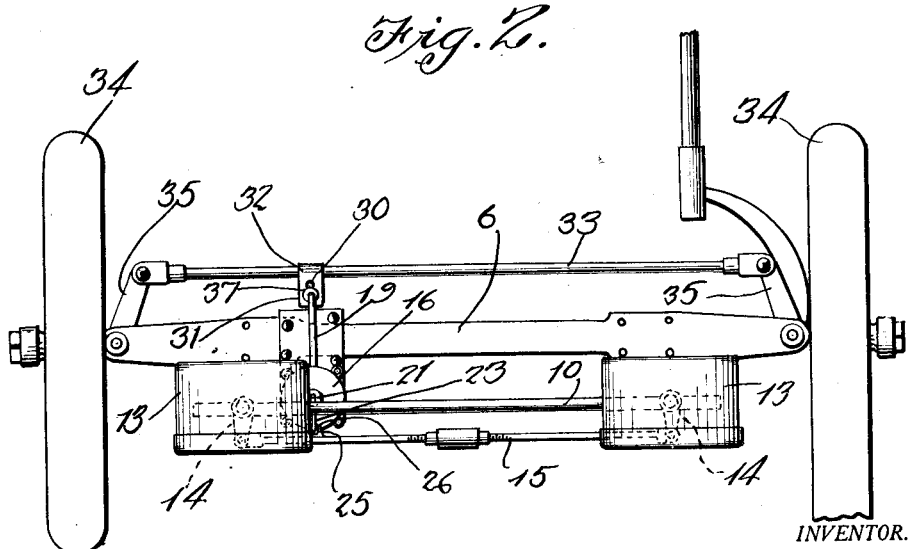
INVENTOR.
Biagis Castiglia.
BY
Bryant & Lowry
ATTORNEYS Nov. 19, 1929.  B. CASTIGLIA  1,736,577
HEADLIGHT CONTROLLING DEVICE
Filed Nov. 4, 1927  2 Sheets-Sheet 2
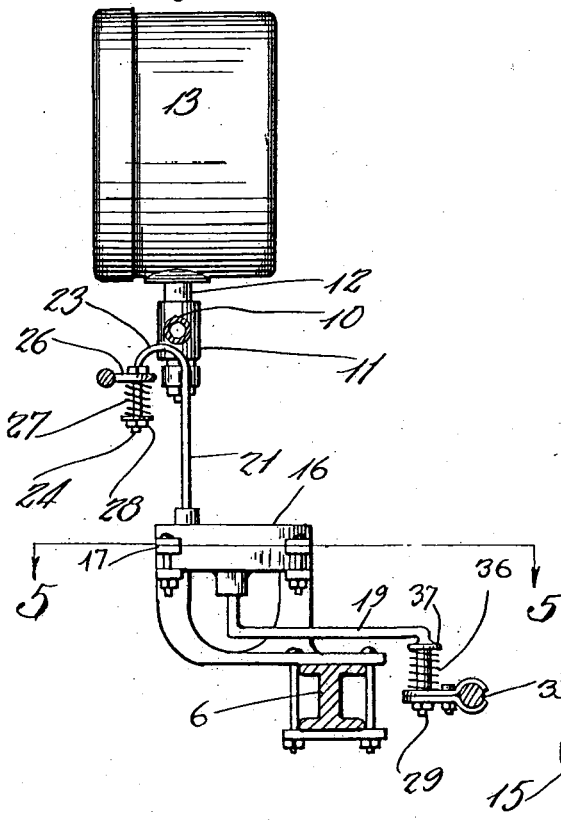
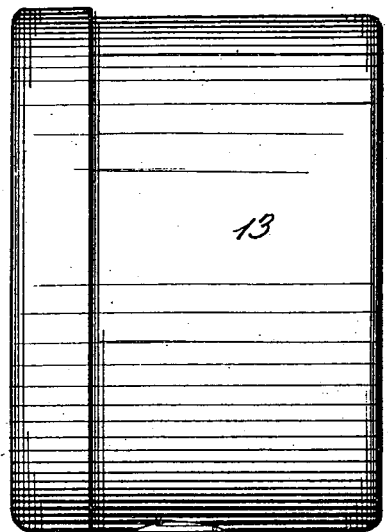
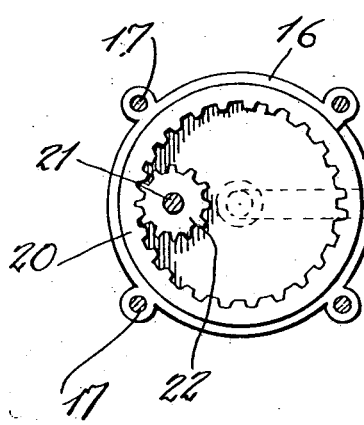
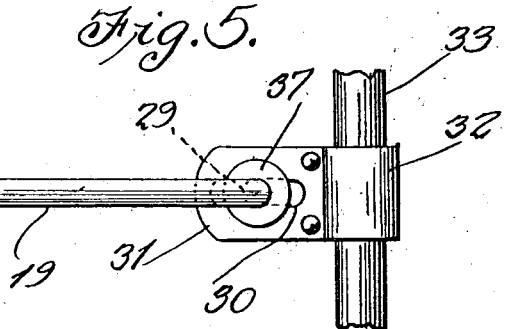
INVENTOR.
Biagis Castiglia.
BY
Bryant & Lowry
ATTORNEYS Patented Nov. 19, 1929

1,736,577

UNITED STATES PATENT OFFICE

BIAGIS CASTIGLIA, OF BRONX, NEW YORK

HEADLIGHT-CONTROLLING DEVICE

Application filed November 4, 1927. Serial No. 231,072.

This invention relates to means for controlling the movements of motor vehicle headlights, and the object of the invention is to provide improved means whereby the light beams of the headlights may be thrown in a direction to cover the path over which the vehicle has to travel.

More particularly, the present invention aims to provide improved means to move the lights simultaneously with the wheels in the same direction and at a greater angle so that not only the portion of the road being travelled over is covered by the lights, but the portion to be travelled over.

A further object is to provide a headlight controlling device of the above kind which is extremely simple and durable in construction, efficient and reliable in operation and capable of being readily and easily installed.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a front elevation of an automobile having a headlight controlling device constructed in accordance with the present invention;

Figure 2 is a fragmentary top plan view thereof;

Figure 3 is a vertical section on line 3—3 of Figure 1;

Figure 4 is an enlarged fragmentary vertical section on line 4—4 of Figure 1; and Figure 5 is an enlarged horizontal section on line 5—5 of Figure 3.

Referring more in detail to the drawings, the automobile is provided with the usual chassis having the projecting side rails 5 which are connected to the front axle 6 by the usual springs 7 and upon which are mounted the usual front mud guards or fenders 8 that are rigidly connected in front of the radiator 9 by means of the horizontal transverse brace rod 10.

The brace rod 10 is formed at its opposite ends with rigid vertical bearing sleeves 11, and extending through as well as journaled in the bearing sleeves 11 are the vertical shafts 12 which are rigid with and depend from the bottoms of the headlights 13. Fixed to the projecting lower ends of the shafts 12 are forwardly projecting crank arms 14 which are connected at their forward ends by a transverse connecting rod 15 that is adjustable in length for permitting setting of the headlights in proper parallel relation.

Rigidly secured upon the axle 6 at the inner side of one of the springs 7 is a circular casing 16 preferably composed of upper and lower half sections bolted together as at 17, and having a central opening in its bottom wall through which projects a shaft having an operating crank 19 and whose upper end is rigid with a circular bottom wall of an internal ring gear 20 which fits the internal periphery of the casing 16. Journaled in the upper section of the casing 16 is a vertical shaft 21 having a gear 22 fixed upon the lower end thereof. It will be noted that the gear 22 is eccentrically mounted with respect to the ring gear 20 and meshes with the latter as well as being somewhat smaller than the same so that the ratio of movement of the gear 22 is somewhat greater than that of the ring gear 20.

The shaft 21 projects upwardly to a point above and rearwardly of the connecting rod 15 where it is formed with a forwardly projecting crank arm 23 having a depending pin portion 24 at its free end pivotally and slidably engaging in an elongated slot 25 of an arm 26 rigid with and projecting rearwardly from the connecting rod 15 as shown clearly in Figures 2 and 3.

The pin 24 projects freely through the slot of arm 26 and some distance below the latter, and a helical spring 27 surrounds the pin 24 between the underside of the arm 26 and a nut 28 on the lower end of the pin 24 for preventing rattling and yet accommodating for any relative vertical movement between the axle carried part and the connecting rod 15.

The operating crank arm 19 is provided at its rear end with a depending pin 29 loosely engaged in a lateral elongated slot 30 provided in the forwardly projecting arm 31 of a clamp 32 applied to the tie rod 33. The tie rod 33 of the vehicle steering mechanism is adapted to operate the wheels 34 through the arms 35 connected to their hubs in the usual manner. A helical spring 36 surrounds the pin 29 between the top of the arm 31 of clamp 32 and an abutment 37 on the upper portion of the pin 29, thereby preventing rattling but accommodating for any relative vertical movement between the axle carried box and the tie rod 33.

In operation, the tie rod 33 is shifted laterally for turning the wheels 34 in the desired direction, thereby swinging arm 19 and rotating ring gear 20 which in turn operates gear 22 and shaft 21 so as to move tie rod 15 in a direction opposite to that of connecting rod 33, thereby simultaneously turning the headlights 13 in the same direction as the wheels 34 are turned. As the gear 22 is somewhat smaller than the driving or ring gear 20, the angle of throw of the wheels is increased a given percentage in the light. In other words, if the wheels are turned a certain degree, the lamps will be turned a greater degree, while when the wheels are straight with the vehicle, the lamps will also be straight.

I am aware of the fact that devices have heretofore been proposed wherein means is provided for turning the headlights to a greater extent than the wheels are turned, but none of these devices heretofore proposed are as simple, durable and efficient as the construction described above and embracing my invention. In other words, it will be noted that the present construction embodies a minimum number of simple and durable parts and a single actuating mechanism for both lamps affording a most direct connection between the lamps and the tie rod 33. At the same time, simple and efficient provision is made for accommodating relative movement between parts so as to avoid damage thereof and avoid rattling without interferring with the action of such parts.

Minor changes may be made without departing from the spirit and scope of the invention as claimed.

What I claim as new is:—

1. In combination, a vehicle having steering wheels, a tie rod therefor, a rigid transverse brace rod, a pair of dirigible headlights mounted on said brace rod, and having forwardly projecting crank arms, a rod connecting said arms, a driving gear mounted on the axle of the vehicle and having an operating arm connected to the tie rod, a driven gear smaller than and meshing with the driving gear, and operating connections between the driven gear and said connecting rod.

2. In combination, a vehicle having steering wheels, a tie rod therefor, a pair of dirigible headlights mounted on the vehicle and having forwardly projecting crank arms, a rod connecting said arms, a driving gear mounted on the axle of the vehicle and having an operating arm connected to the tie rod, a driven gear smaller than and meshing with the driving gear, operating connections between the driven gear and said tie rod, a clamp applied to the tie rod and having a forwardly projecting arm formed with an elongated slot, said operating arm having a rigid depending pin at its rear end vertically movable in said slot, an abutment on said pin above the clamp arm, and a spring encircling the pin between the clamp arm and said abutment.

3. In combination, a vehicle having steering wheels, a tie rod therefor, a pair of dirigible headlights mounted on the vehicle and having forwardly projecting crank arms, a rod connecting said arms, a driving gear mounted on the axle of the vehicle and having an operating arm connected to the tie rod, a driven gear smaller than and meshing with the driving gear, a vertical shaft journaled on the axle and having the driven gear fixed on its lower end, and a forwardly projecting crank arm on the upper end of said shaft operatively connected to said connecting rod.

4. In combination, a vehicle having steering wheels, a tie rod therefor, a pair of dirigible headlights mounted on the vehicle and having forwardly projecting crank arms, a rod connecting said arms, a driving gear mounted on the axle of the vehicle and having an operating arm connected to the tie rod, a driven gear smaller than and meshing with the driving gear, a vertical shaft journaled on the axle and having the driven gear fixed on its lower end, a forwardly projecting crank arm on the upper end of said shaft operatively connected to said connecting rod, said connecting rod having a member formed with an elongated slot, a vertical pin on the crank arm of said shaft vertically movable in said slot, an abutment on said pin, and a spring encircling the pin between said slotted member and said abutment.

5. The combination with a vehicle having a tie rod, a pair of dirigible headlights mounted on the vehicle, means connecting said headlights for movement in unison including a connecting rod, a differential gearing mounted on the vehicle axle, said gearing embodying ring and spur gears, a connection between the ring gear and the tie rod, and a connection between the spur gear and the headlight connecting rod.

6. In combination, a vehicle having steering wheels, a tie rod therefor, a rigid transverse brace rod, having bearing sleeves at opposite ends, vertical shafts mounted in said sleeves, a pair of dirigible headlights to which said shafts are attached, crank arms attached to said shafts and projecting forwardly of the shafts, an adjustable connecting rod for said crank arms, a pair of differential gears comprising a driving and a driven gear, connections between the driven gear and said connecting rod, a clamp mounted on the tie rod and adjustable connections between said clamp and said driving gear.

In testimony whereof I affix my signature.

BIAGIS CASTIGLIA.